United States Patent
Weland

(10) Patent No.: US 10,054,034 B1
(45) Date of Patent: Aug. 21, 2018

(54) TWO-CYCLE INTERNAL COMBUSTION ENGINE

(71) Applicant: LaVaughn C. Weland, Cadillac, MI (US)

(72) Inventor: LaVaughn C. Weland, Cadillac, MI (US)

(*) Notice: Subject to any disclaimer, the term of this patent is extended or adjusted under 35 U.S.C. 154(b) by 47 days.

(21) Appl. No.: 15/373,985

(22) Filed: Dec. 9, 2016

Related U.S. Application Data

(60) Provisional application No. 62/264,911, filed on Dec. 9, 2015.

(51) Int. Cl.
*F02B 19/06* (2006.01)
*F02B 75/02* (2006.01)
*F02B 75/00* (2006.01)
*F16H 21/18* (2006.01)

(52) U.S. Cl.
CPC ............. *F02B 19/06* (2013.01); *F02B 75/005* (2013.01); *F02B 75/02* (2013.01); *F16H 21/18* (2013.01); *F02B 2075/025* (2013.01)

(58) Field of Classification Search
CPC .... F02B 75/32; F02B 77/00; F02B 2075/025; F02B 75/02; F02B 75/005; F02B 19/06; F16H 21/18
See application file for complete search history.

(56) References Cited

U.S. PATENT DOCUMENTS

| | | | |
|---|---|---|---|
| 1,664,091 A * | 3/1928 | Sinclair | F02B 25/00 123/65 VB |
| 3,945,367 A | 3/1976 | Turner, Jr. | |
| 3,999,523 A * | 12/1976 | Andreen | F02B 75/32 123/52.5 |
| 4,096,845 A | 7/1978 | Holmes | |
| 4,121,480 A * | 10/1978 | Andreen | F02B 75/32 123/197.5 |
| 4,516,539 A * | 5/1985 | Andreen | F02B 33/16 123/197.1 |
| 5,243,938 A | 9/1993 | Yan | |
| 6,467,440 B1 * | 10/2002 | Kozulin | F02B 33/10 123/51 B |
| 6,655,337 B2 | 12/2003 | Hirano et al. | |
| 6,948,458 B2 | 9/2005 | Ariyakunakom | |
| 2013/0121860 A1 | 5/2013 | Bluhm et al. | |

FOREIGN PATENT DOCUMENTS

| | | | | |
|---|---|---|---|---|
| FR | 2244912 A1 * | 4/1975 | | F02B 19/109 |
| GB | 740135 A * | 11/1955 | | B05B 7/1673 |

* cited by examiner

*Primary Examiner* — Patrick Maines
(74) *Attorney, Agent, or Firm* — Cramer Patent & Design, PLLC; Aaron R. Cramer

(57) ABSTRACT

An engine includes an engine housing defining a pair of cylinders, a pair of ignitor cylinders and a crankcase, a pair of cylinder heads connected to the engine housing and enclosing the pair of cylinders, a pair of spark plugs connected to the pair of cylinder heads and in communication with the pair of cylinders, a piston assembly in communication with the pair of cylinders, a rocker arm connected to the piston assembly, a connecting rod connected to the rocker arm, and a drive shaft disposed within the crankcase and connected to the connecting rod, a pair of ignitor cylinder plugs fit within the pair of ignitor cylinders, ignitor piston rod apertures formed though the engine housing, and rod aperture plugs fit within the piston rod apertures.

20 Claims, 6 Drawing Sheets

TWO-CYCLE INTERNAL COMBUSTION ENGINE

RELATED APPLICATIONS

The present invention was first described in and claims the benefit of U.S. Provisional Application No. 62/264,911, filed Dec. 9, 2015, the entire disclosures of which are incorporated herein by reference.

FIELD OF THE INVENTION

The present invention relates generally to engines and, more particularly, to a two-cycle internal combustion engine adapted from an existing four-cylinder engine.

BACKGROUND OF THE INVENTION

The automotive industry is in a constant search for methods and devices that will improve the fuel efficiency of vehicles without sacrificing engine performance. Furthermore, governmental restrictions and guidelines serve to provide additional motivation to develop these products. The fruits of these efforts have consisted mainly of new fuel injected engines, computer controlled fuel supplies, reduced emissions, and fuel additives. Other technologies, such as superchargers and turbo chargers, have resulted as well, with a widespread acceptance by both the public and manufacturers alike.

Accordingly, there is a need for continuous development and improvement in the field of internal combustion engines and, more particularly, with respect to increased energy output for a fixed amount of fuel consumption of internal combustion engines.

SUMMARY OF THE INVENTION

The inventor has recognized the aforementioned inherent problems and lack in the art and observed that there is a need for a device that prevents a patient from biting down, and closing off an endotracheal tube as well as preventing costly damage to equipment. The development of the present invention, which will be described in greater detail herein, fulfills this need.

In an embodiment, the disclosed engine includes an engine housing defining a pair of cylinders, a pair of ignitor cylinders and a crankcase, a pair of cylinder heads connected to the engine housing and enclosing the pair of cylinders, a pair of spark plugs connected to the pair of cylinder heads and in communication with the pair of cylinders, a piston assembly in communication with the pair of cylinders, a rocker arm connected to the piston assembly, a connecting rod connected to the rocker arm, and a drive shaft disposed within the crankcase and connected to the connecting rod, a pair of ignitor cylinder plugs fit within the pair of ignitor cylinders, ignitor piston rod apertures formed though the engine housing, and rod aperture plugs fit within the piston rod apertures.

In another embodiment, the disclosed engine includes an engine housing, a first cylinder defined by the engine housing, a second cylinder defined by the engine housing, a crankcase defined by the engine housing, a first cylinder head connected to the engine housing and enclosing the first cylinder, a second cylinder head connected to the engine housing and enclosing the second cylinder, a piston assembly including a first piston rod, a first piston connected to the first piston rod and configured to reciprocate within the first cylinder, a second piston rod, a second piston connected to the second piston rod and configured to reciprocate within the second cylinder, and a crosshead block interconnecting the first piston rod and the second piston rod, a rocker arm including a rocker arm first end pivotably connected to the crosshead block and a rocker arm second end, a connecting rod including an annular connecting rod first end and a connecting rod second end pivotably coupled to the rocker arm second end, a drive shaft disposed within the crankcase and including an eccentric cam disposed within the annular connecting rod first end, a first counterbalance arm including a first counterbalance arm first end pivotably connected to the engine housing and a first counterbalance arm second end including a first head, the first counterbalance arm connected to the rocker arm second end at a first counter balance arm intermediate location, a second counter balance arm including a second counterbalance arm first end pivotably connected to the engine housing and a second counterbalance arm second end including a second head, the second counter balance arm pivotably connected to the rocker arm at a second counter balance arm intermediate location, an upper guide and an opposed lower guide connected within the engine housing and configured restrict the crosshead block to reciprocal motion, a first ignitor cylinder defined by the engine housing, a first ignitor cylinder plug fit within the first ignitor cylinder, a second ignitor cylinder defined by the engine housing, a second ignitor cylinder plug fit within the second ignitor cylinder, ignitor piston rod apertures formed though the engine housing, rod aperture plugs fit within the piston rod apertures, and a housing cap connected to the engine housing and including a crankcase vent configured to equalize pressure in the crankcase.

In yet an embodiment, the disclosed method for modifying an engine includes the steps of: 1). providing the engine including an engine housing defining a pair of cylinders, a pair of ignitor cylinders and a crankcase, a pair of cylinder heads connected to the engine housing and enclosing the pair of cylinders, each cylinder head including a main compression cavity configured to align with one (1) of the pair of cylinders, a spark plug aperture, an ignition port extending between the spark plug aperture and the main compression cavity, a piston assembly including a pair of ignitor pistons configured to reciprocate within the pair of ignitor cylinders, and a pair of pistons configured to reciprocate within the pair of cylinders, a rocker arm connected to the piston assembly, a connecting rod connected to the rocker arm, a drive shaft disposed within the crankcase and connected to the connecting rod, and ignitor piston rod apertures formed though the engine housing; 2). removing the pair of ignitor pistons; 3). fitting a pair of ignitor cylinder plugs within the pair of ignitor cylinders; 4). fitting rod aperture plugs within the piston rod apertures; 5). fitting an ignition port plug within the first ignition port; and, 6). forming another spark plug aperture through the cylinder head within the main compression cavity.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following

Figure 1:
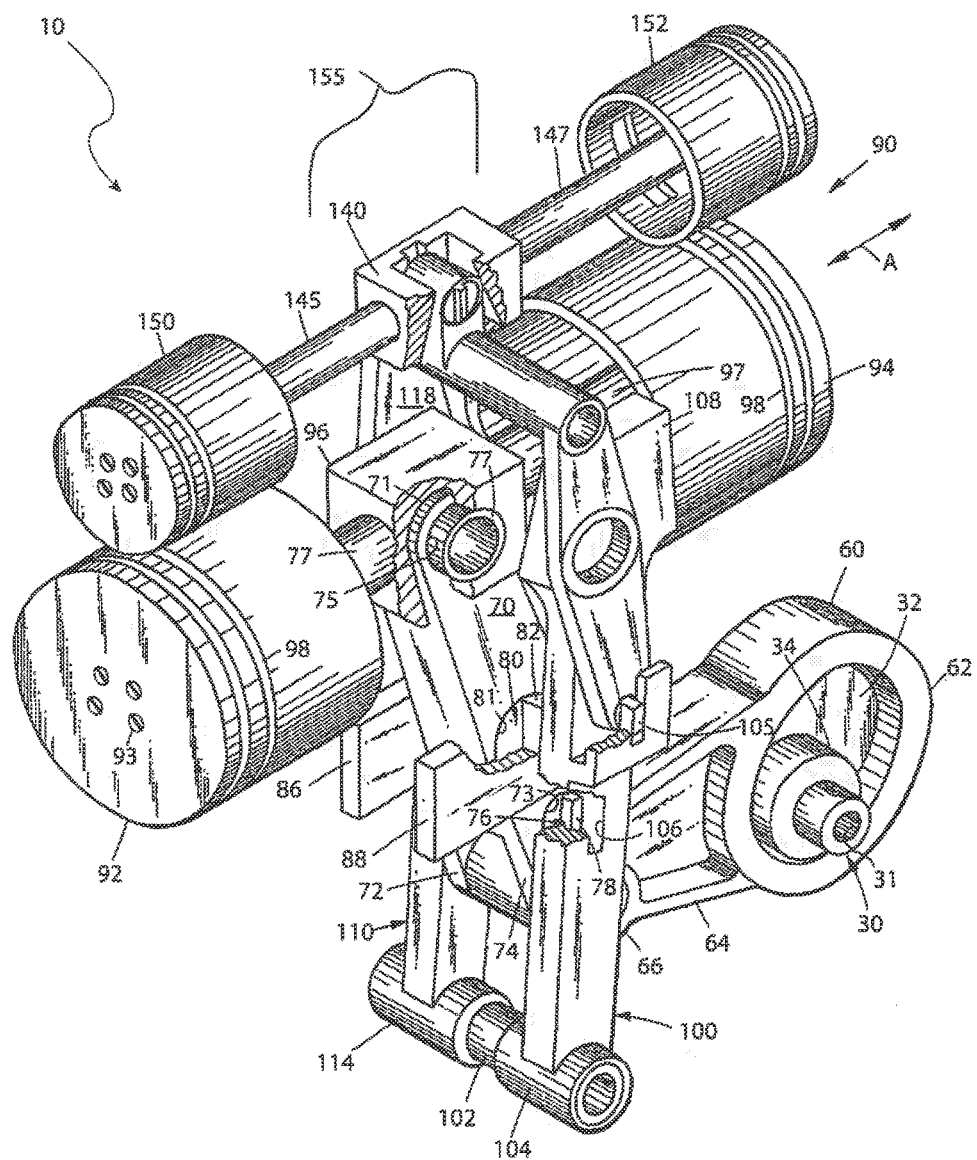
FIG. 1 is isolated view of major internal moving elements of an embodiment of an unmodified engine.

DESCRIPTIVE KEY 10 unmodified two-cycle engine
12 engine first housing
13 transmission mounting bell
14 engine second housing
15 drive gear
16 first cylinder housing
18 second cylinder housing
20 housing cap
25 crankcase
26 first main bearing
27 first journal
28 second main journal
29 second journal
30 drive shaft
31 shaft aperture
32 eccentric cam
33 first external thread
34 first shoulder
35 second external thread
36 second shoulder
37 first shaft seal
38 second shaft seal
39 outer surface
40 flywheel mounting flange
42 cylindrical disc
44 annular recess
45 flywheel
46 transmission shaft
47a pilot bearing
47b recess
48 spline
50 clutch
51 clutch connection
53 flywheel connection
54 transmission connection
55 transmission
56 fan blades
60 connecting rod
62 connecting rod first end
63 roller bearing
64 connecting rod body
66 connecting rod second end
68 connecting rod pin
69 connecting rod pin aperture
70 rocker arm
71 rocker arm upper end
72 first leg
73 rocker arm aperture
74 second leg
75 crosshead pivot pin aperture
76 counterbalance drive pin
77 crosshead pivot pin
78 counterbalance pin key
80 rocker arm pivot pin
81 rocker arm pivot pin aperture
82 rocker arm pivot pin key
84 vertical slot
85 pivot guide fastener
86 first rocker pivot guide
88 second rocker pivot guide
89 transfer port
90 piston assembly
92 first piston
93 piston fastener
94 second piston
95 first piston rod
96 crosshead block
97 second piston rod
98 compression ring
100 first counterbalance arm
102 pivot pin
104 first sleeve
106 first key slot
108 first head
110 second counterbalance arm
114 second sleeve
116 second key slot
118 second head
134 first cylinder
136 second cylinder
140 second crosshead block
145 first igniter piston rod
147 second igniter piston rod
150 first igniter piston
152 second igniter piston
155 interconnecting linkage
160 upper crosshead guide
162 lower crosshead guide
170 first rod aperture
171 second rod aperture
172 first rod seal
173 second rod seal
174 igniter piston rod aperture
190 igniter cylinder
200 exhaust manifold
204 carburetor
206 manifold mounting flange
208 small intake aperture
210 first manifold passageway
212 first manifold opening
214 second manifold opening
215a first mounting plate surface
215b second mounting plate surface
216 secondary intake aperture
218 second manifold passageway
220 third manifold opening
222 fourth manifold opening
223 first exhaust duct aperture
224 first exhaust duct 225a first exhaust flange
225b second exhaust flange
226 second exhaust duct
227 second exhaust duct aperture
230 flame ignition port
232 spark plug
235 annular ring
236 main compression cavity
300 modified engine
305 modified cylinder head
305a first modified cylinder head
305b second modified cylinder head
310 weld plug
315 modified spark plug aperture
320 cylinder plug
325 rod aperture plug
330 crankcase vent
335 manifold plug

DETAILED DESCRIPTION OF THE
PREFERRED EMBODIMENT

In accordance with the invention, the best mode is presented in terms of example embodiments, herein depicted within FIGS. 1-7. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one (1) particular configuration may be shown and described for purposes of clarity and disclosure and not by way of limitation of scope.

The terms "a" and "an" herein do not denote a limitation of quantity, but rather denote the presence of at least one (1) of the referenced items.

Referring to FIGS. 1-7, disclosing a modified two-cycle internal combustion engine, generally referred to herein as the modified engine 300, where like reference numerals represent similar or like parts. The modified engine 300 in an alteration or modification of an unmodified two-cycle internal combustion engine, generally referred to herein as the unmodified engine 10. In the embodiments illustrated in FIGS. 1-7, some exemplary parts or pieces of parts may be broken away, or shown in phantom, for purposes of clarification.

FIG. 1 is a schematic illustration of an isolated view of major internal moving elements of an example embodiment of the unmodified engine 10. The unmodified engine 10 is an illustration of an existing two-cycle internal combustion engine prior to the modifications disclosed herein resulting in the disclosed modified engine 300. A two-cycle internal combustion engine such as described in U.S. Pat. No. 3,999,523, titled "Internal Combustion Engine," which issued on Dec. 28, 1976 and U.S. Pat. No. 4,121,480, titled "Internal Combustion Engine and Transmission Coupling," which issued on Oct. 24, 1978, the entire contents of which are incorporated herein by reference, may be examples of the unmodified engine 10.

Figure 2:
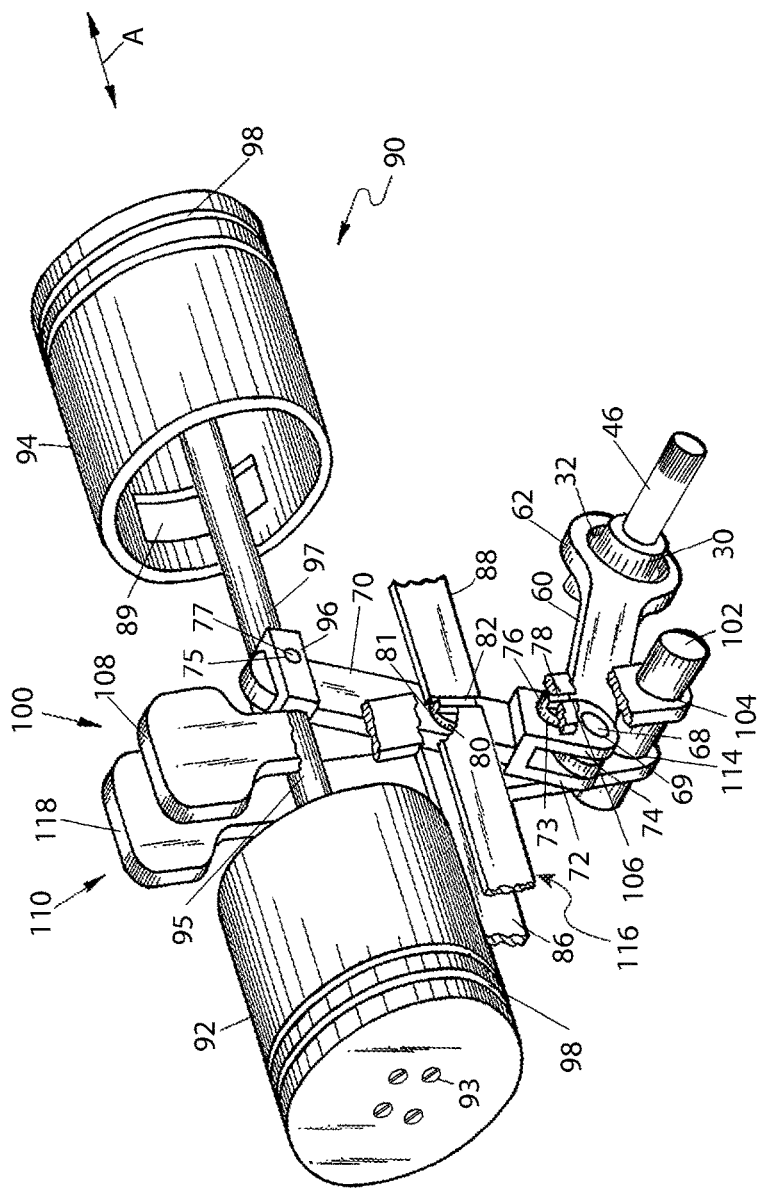
FIG. 2 is an isolated view of major internal moving elements of an embodiment of the disclosed modified engine.

FIG. 2 is schematic illustration of an isolated view of major internal moving elements, with some parts broken away, of an example embodiment of the disclosed modified engine 300. As described herein, and illustrated in FIG. 2, the modifications to the unmodified engine 10 include removing igniter pistons, identified individually as a first igniter piston 150 and a second ignitor piston 152, and the associated interconnecting linkage 155, thus, simplifying the operation of the modified engine 300. The modified engine 300 is configured to be fueled with a standard octane gasoline, rather than a partial mix of gasoline and oil as is typical of traditional two-cycle internal combustion engines, such as the unmodified engine 10. Throughout this disclosure and the accompanying drawings, reference numerals representing similar or like parts between the unmodified engine 10 and the modified engine 300 remain the same.

Figures 3, 3A:
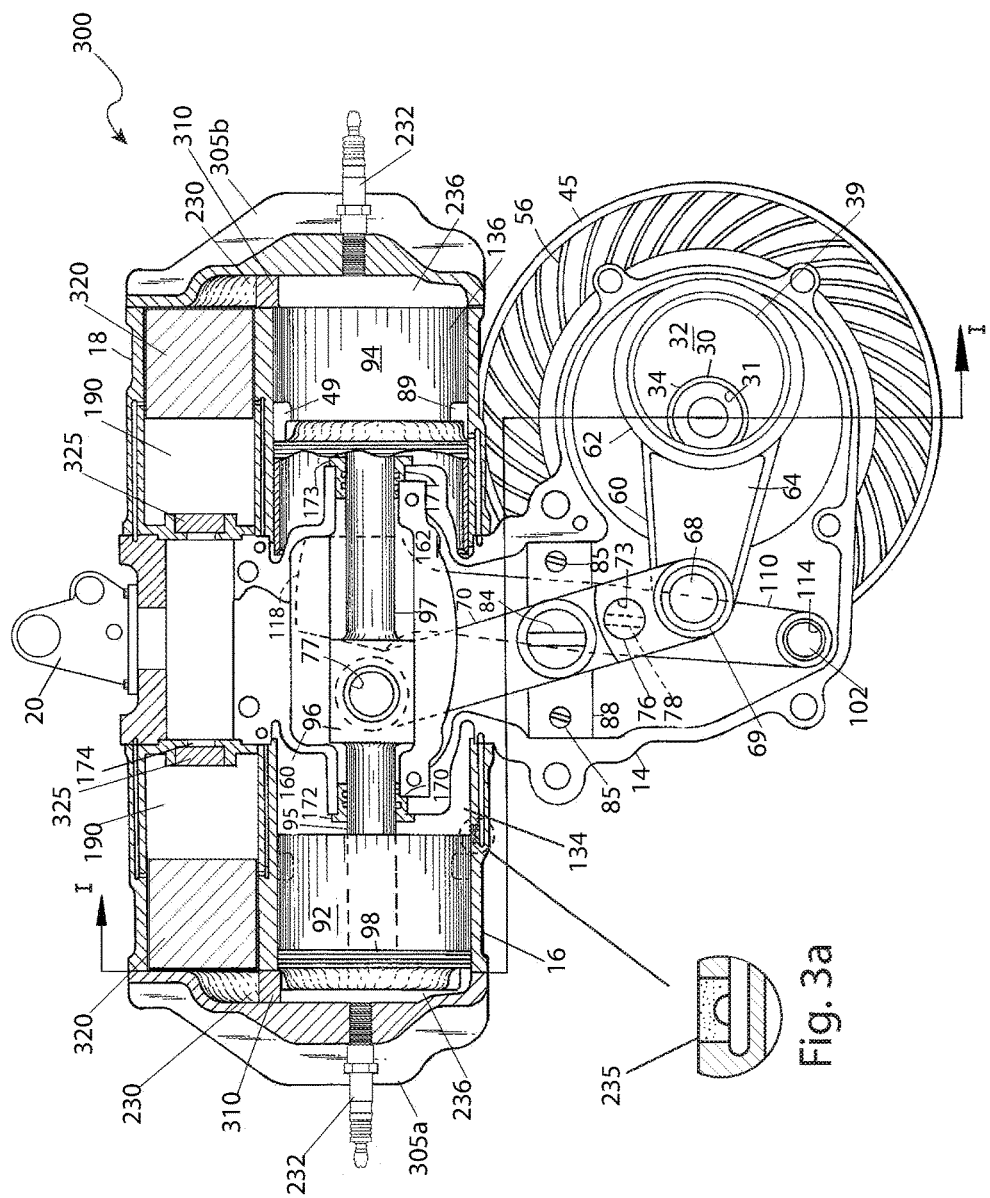
FIG. 3 is a cross-section view taken along line II-II, as seen in FIG. 4, of the modified engine.
FIG. 3a is a close-up cross-section view of the lubricating annular ring 235, as described and illustrated previously in U.S. Pat. Nos. 3,999,523 and 4,121,480, of the modified engine.
Figure 4:
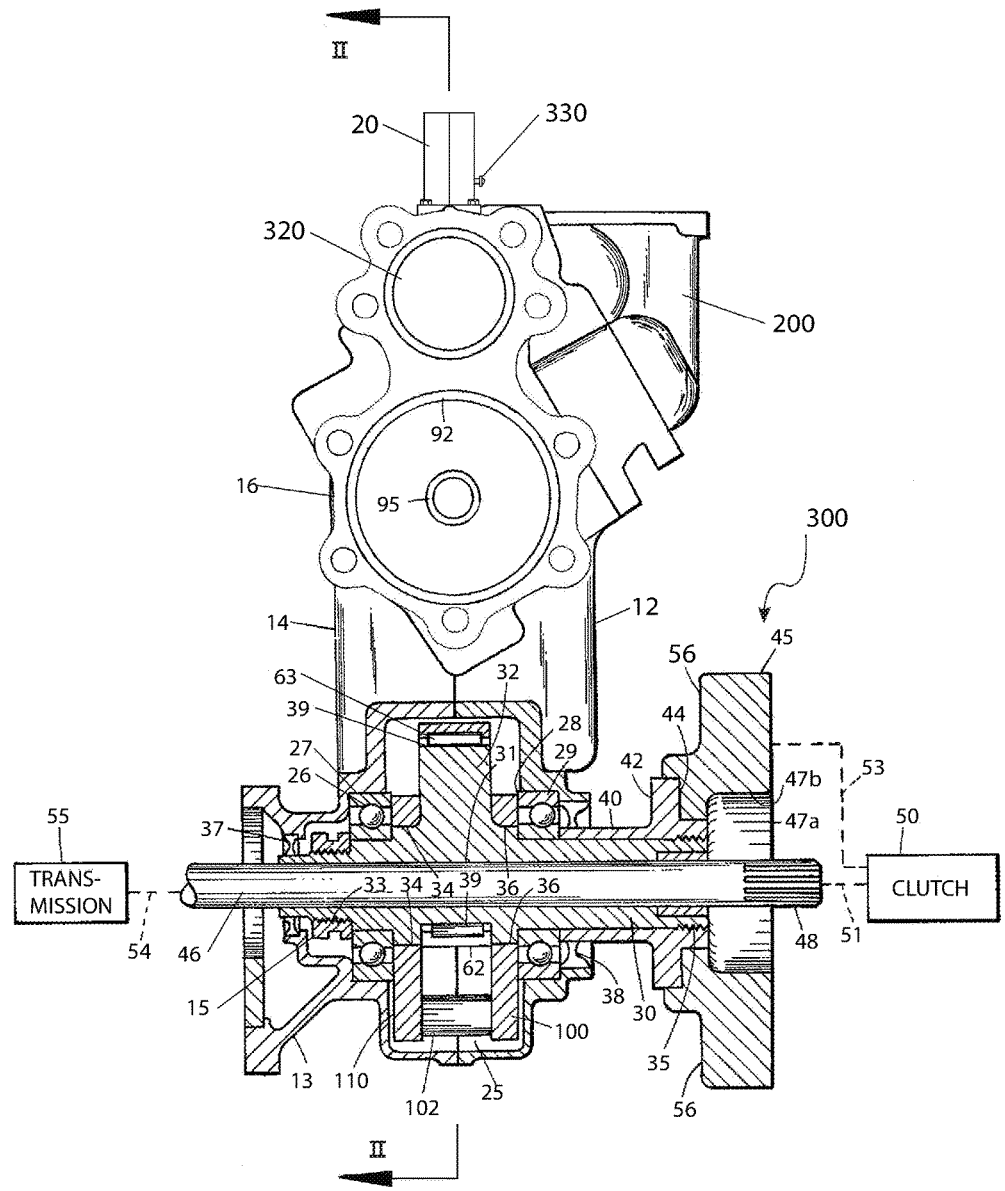
FIG. 4 is a cross-section view along line I-I, as seen in FIG. 3, of the modified engine.

FIG. 3 is a schematic illustration of a cross-section view of an embodiment of the modified engine 300, taken along section line II-II of FIG. 4. FIG. 4 is a schematic illustration of a cross-section view of an embodiment of the modified engine 300, taken along line I-I of FIG. 3. The modified engine 300 may generally include elements and features in common with the unmodified engine 10 (FIG. 1) and common to various two-cycle internal combustion engines, such as those described in U.S. Pat. No. 3,999,523 and U.S. Pat. No. 4,121,480. In the illustrated example embodiments, the modified engine 300 (and the unmodified engine 10) include an engine first housing 12 (FIG. 4) and an engine second housing 14 (FIGS. 3 and 4). The housings 12, 14 are secured to each another by conventional fasteners to form a lower portion of the modified engine 300, for example, typically referred to as the block. Attached to the joined housings 12, 14 are a first cylinder housing 16 and a second cylinder housing 18 (FIG. 3), which are secured to the joined housings 12, 14, for example, by a customary means, including gaskets for sealing all housing sections 12, 14, 16, 18. The first cylinder housing 16 and the second cylinder housing 18 each have internal voids for the first cylinder 134 (FIG. 3) and the second cylinder 136 (FIG. 3), respectively. Access through a top of the combined housing structure is provided by a removable housing cap 20 fastened to the housings 12, 14. The housing cap 20 is provided with a crankcase vent 330 (FIG. 4) to equalize any pressure in the enclosed crankcase 25 (FIG. 4) with the atmosphere due to thermal expansion during operation. The exterior enclosing portions of the engine are completed by a pair of modified cylinder heads 305 (FIG. 5), identified as a first modified cylinder 305a and a second modified cylinder head 305b (FIG. 3). Each of the housing members 12, 14, 16, 18, and 20 is cast of a suitable material, preferably an aluminum alloy.

Referring still to FIGS. 3 and 4, the lower portions of the engine housings 12, 14 define the crankcase 25 (FIG. 4), which houses a drive shaft 30. The crankcase 25 and the drive shaft 30 are fully described, with all enumerated elements and features, in the examples of the unmodified engine, such as previously identified in U.S. Pat. No. 3,999,523 and U.S. Pat. No. 4,121,480. The drive shaft 30 is configured as a hollow, elongated shaft that traverses the crankcase 25 and is provided with an eccentric cam 32 encircling a central portion thereof. The eccentric cam 32 provides a means by which power is transferred from a piston assembly 90 (FIGS. 1 and 2) through a rocker arm 70 (FIGS. 1-3) and a connecting rod 60 (FIGS. 1-3) to the drive shaft 30. The single connecting rod 60 includes an annular connecting rod first end 62 (FIGS. 1-4) surrounding the eccentric cam 32 of the drive shaft 30.

A roller bearing 63 (FIG. 4) is disposed between an outer surface 39 (FIGS. 3 and 4) of the eccentric cam 32 and an inner surface in the first end 62 of the connecting rod 60, as best illustrated in FIG. 4. The roller bearing 63 is a commercially available bearing that may include spherical, or cylindrical, rolling elements specifically selected for the modifications disclosed herein.

A connecting rod body 64 (FIGS. 2 and 3) tapers to a connecting rod second end 66 (FIG. 2). The connecting rod second end 66 (FIG. 2) is pivotally coupled to a first end of the rocker arm 70 (FIGS. 1-3) by means of a connecting rod pin 68 (FIGS. 1 and 3). The rocker arm 70 includes a descending first leg 72 (FIGS. 1 and 2) and a similarly configured second leg 74 (FIGS. 1 and 2), which span the connecting rod second end 66 and include connecting rod pin apertures 69 (FIGS. 1 and 3) through which the cylindrical connecting rod pin 68 (FIGS. 1 and 3) extends.

Disposed, in synchronous alignment, through the first leg 72 and the second leg 74 is a rocker arm aperture 73 (FIGS. 1-3) extending therethrough slightly above the connecting rod pin apertures 69 (FIGS. 1 and 3) for pivotally receiving a counterbalance drive pin 76 (FIGS. 1-3). The counterbalance drive pin 76 has keys 78 (FIGS. 1-3), configured to be rectangular polyhedral extensions of an otherwise cylindrical shape, on opposite ends thereof for engaging a pair of counterbalancing arms, identified as a first counterbalance arm 100 (FIGS. 1, 2 and 4) and a second counterbalance arm 110 (FIGS. 1-4).

The rocker arm 70 is pivotally coupled to the engine housings 12, 14 by means of a rocker arm pivot pin 80 (FIGS. 1 and 2) extending through a rocker arm pivot pin aperture 81 (FIGS. 1 and 2) in the rocker arm 70 and positioned above the rocker arm aperture 73 (FIGS. 1-3). The rocker arm pivot pin 80 includes a pair of vertically extending rocker arm pivot pin keys 82 (FIGS. 1 and 2) on opposite ends thereof that engage into vertical slots 84 (FIG. 3) formed in a first rocker pivot pin guide 86 (FIGS. 1 and 2) secured within the engine first housing 12 (FIG. 4) and a second rocker pivot guide pin 88 (FIGS. 1-3) secured within engine the second housing 14 (FIGS. 3 and 4) by means of pivot guide fasteners.

Referring to FIGS. 1-3, the rocker pivot pin guides 86 and 88 permit the rocker arm 70 to pivot with respect to the engine housings 12, 14 and oscillate the connecting rod 60 during operation while allowing the rocker arm 70 to move vertically sufficiently as the first end 62 moves up and down. Thus, the interconnection of the rocker arm 70 to the engine housings 12, 14 provides a floating pivot point permitting the required rotary and linear motions of the rocker arm 70.

Referring to FIGS. 1 and 2, the upper end of the rocker arm 70 includes a crosshead pivot pin aperture 75 therethrough for receiving a crosshead pivot pin 77 (FIGS. 1-3) providing a pivot connection between an upper end 71 (FIG. 2) of the rocker arm 70 and the main engine piston assembly 90.

Referring to FIGS. 1-4, the piston assembly 90 includes a first piston 92 and a second piston 94 (FIGS. 1-3) mounted on a first piston rod 95 (FIGS. 1, 3 and 4) and a second piston rod 97 (FIGS. 1-3), respectively. The first piston rod 95 and the second piston rod 97 extending from opposite ends of an integral crosshead block 96 (FIGS. 1-3). The piston rods 95, 97 are preferably hollow and include threaded apertures (not shown) at each distal end thereof permitting the pistons 92, 94 to be removably attached by means of piston fasteners 93 (FIGS. 1 and 2) that extend through apertures (not specifically shown) in the heads of the pistons 92, 95.

The pistons 92, 94 include conventional compression rings 98 (FIGS. 1-3). The motion of the opposed pistons 92, 94 is in a reciprocal fashion within the cylinders along a line of travel indicated by arrow A in FIG. 2 and causes the rocker arm 70 to reciprocate about the rocker pivot pin 80 (FIGS. 1 and 2), in turn causing the connecting rod 60 (FIGS. 1-3) to move back and forth and slightly vertically driving the eccentric drive of drive shaft 30 (FIGS. 1-4) causing it to rotate continuously in one (1) direction as the pistons 92, 94 reciprocate.

The first counterbalance arm 100 (FIGS. 1, 2 and 4) and the second counterbalance arm 110 (FIGS. 1-4) are provided in order to counterbalance the moving mass of the piston assembly 90. The first counterbalance arm 100 is pivotally mounted to the engine first housing 12 at a first end by means of a cylindrical pivot pin 102 (FIGS. 1-4) extending through an integrally formed first sleeve 104 (FIGS. 1 and 2) inserted through a lower end of the first counterbalance arm 100 and seated within a cast journal (not specifically shown) in the engine first housing 12. The same pivot pin 102 further extends through a similar second sleeve 114 (FIGS. 1-3) formed into a lower end of the second counterbalance arm 110 and is seated within a cast and machined journal (not shown) of the engine second housing 14.

The first counterbalance arm 100 is configured to have an enlarged first head 108 (FIGS. 1 and 2) at a second end that can be drilled and weighted, preferably with a high-density material, such as lead, to increase the mass thereof for additional counterbalancing effect. The second counterbalance arm 110 is configured in a similar manner with a second head 118 (FIGS. 1-3). Disposed within the first counterbalance arm 100, in proximity to the first sleeve 104 (FIGS. 1 and 2), is a longitudinally extending first key slot 106 (FIGS. 1 and 2) for receiving a counterbalance pin key 78 (FIGS. 1-3) on a first end of the previously discussed counterbalance drive pin 76 (FIGS. 1-3). The second counterbalance arm 110 is provided with a similarly configured second key slot 116 (FIGS. 1 and 2) for receiving a counterbalance pin key 78 (FIGS. 1-3) on a second end of the counterbalance drive pin 76.

As the rocker arm 70 oscillates about the rocker arm pivot pin 80 (FIGS. 1 and 2), the counterbalance drive pin 76 (FIGS. 1-3) causes the counterbalance arms 100 and 110 to move in a direction opposite the pistons 92, 94, thereby providing the desired counterbalancing effect. The first counterbalance arm 100 is positioned on a distal side of the first rocker pivot guide 86 (FIGS. 1 and 2) and connected thereto as previously discussed. Similarly, the second counterbalance arm 110 is positioned on a distal side of the second rocker pivot guide 88 (FIGS. 1-3). The dynamic balancing of the engine is therefore facilitated by this pair of spaced counterbalance arms 100, 110, each with weighted heads 108, 118 (FIGS. 1-3).

Referring to FIG. 3, the crosshead block 96 (FIGS. 1-3) is preferably a rectangular polyhedron supported between the engine housings 12, 14 by the inclusion of an upper guide 160 and a lower guide 162. The upper guide 160 is secured preferably to the engine second housing 14 by an appropriate means and provides a clearance for the counterbalance arms 100, 110. The lower guide 162 is configured to be a symmetrically split pair of support members, equally attached to the engine housings 12, 14, upon which the crosshead block 96 is permitted to reciprocally slide.

Referring to FIGS. 1-4, the engine housings 12 and 14 (FIGS. 3 and 4) extend upwardly around the crosshead block 96 (FIGS. 1-3) and the piston rods 95, 97 (FIG. 3) to permit the sealing of the crankcase 25 (FIG. 4) from the cylinders 134, 136 (FIG. 3). A first rod aperture 170 (FIG. 3) is formed through the housing, permitting the first piston rod 95 to extend therethrough. A first rod seal 172 (FIG. 3) is fitted into the first aperture 170 thereby segregating the crankcase 25 from the first cylinder 134. An identical second rod seal 173 (FIG. 3) is inserted into a second rod aperture 171 (FIG. 3) on an opposite side of the crosshead block 96 to seal the second piston rod 97. The lubrication of the modified engine 300, particularly in reference to the sintered bronze annular oiling ring 235 for both cylinders 134, 136, is thoroughly described in relation to the unmodified engine 10, such as previously identified in U.S. Pat. No. 3,999,523 and U.S. Pat. No. 4,121,480 and, therefore, will not be described in further detail.

Referring to FIG. 1, during modification of the unmodified engine 10, a first igniter piston 150, a second igniter piston 152, along with a first igniter piston rod 145, a second igniter piston rod 147, a second crosshead block 140, and the interconnecting linkage 155 are removed to yield the moving elements of the modified engine 300 (FIG. 2). Those skilled in the art will recognize that in other embodiments of the unmodified engine 10, for example, other than those described in previously identified U.S. Pat. No. 3,999,523 and U.S. Pat. No. 4,121,480, other components may also be eliminated without limiting the scope or the teachings of the present disclosure.

Referring to FIGS. 3 and 4, a cylinder plug 320, preferably composed of a one and one-half inch (1½ in) diameter by two-inch (2 in) cylinder, is intended to be pressed into an igniter cylinder 190 (FIG. 3). The cylinder plug 320 will block the igniter cylinder 190 cavities to obviate the introduction of any engine lubricant, or other fluids. The symmetrical igniter piston rod apertures 174 (FIG. 3) formed into the engine housings 12, 14 are also plugged utilizing a pair of rod aperture plugs 325 (FIG. 3). The rod aperture plugs 325 may be installed into the igniter rod piston apertures 174 by any appropriate means necessary to accomplish that task. The igniter rod piston apertures 174 are sealed from the crankcase 25 in this manner.

Figure 5:
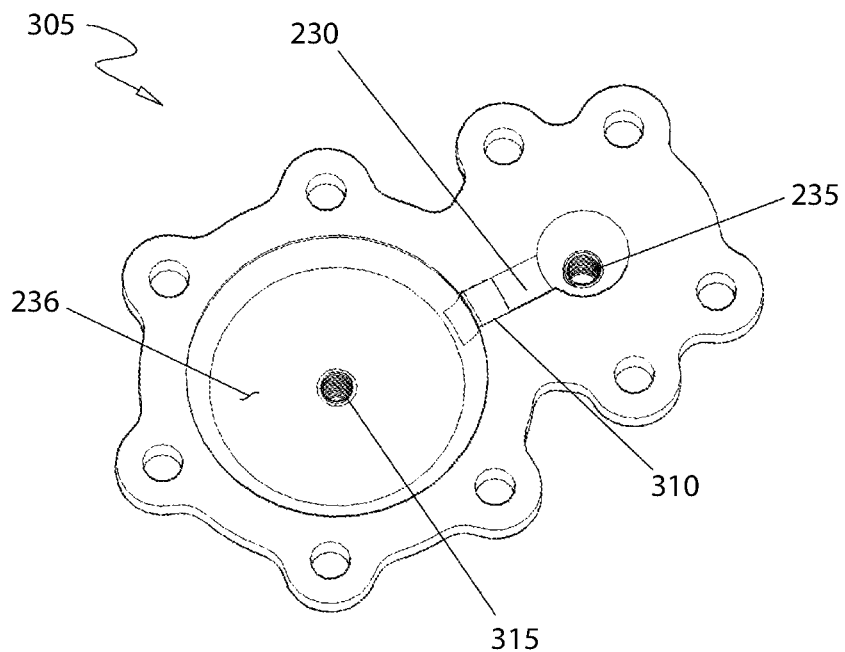
FIG. 5 is an isolated view of an embodiment of a modified cylinder head of the disclosed modified engine.

FIG. 5 is an isolated view of an embodiment of a modified cylinder head 305 of the disclosed modified engine 300. A weld plug, also referred to herein as an ignition port plug, 310 is placed into a flame ignition port 230 in each of the first cylinder head 22 (FIG. 3) and the second cylinder head 24 (FIG. 3) thereby yielding the modified cylinder head 305. The weld plug 310 is preferably composed of the electrode deposition of an arc welding procedure. An internal face of the modified cylinder head 305 is then machined, in a grinding, or a lapping, operation to return that face to the correct flatness to seal the respective cylinder 134, 136 (FIG. 3) against the combustion forces. Additionally, a modified spark plug aperture 315 is drilled and threaded into the main compression cavity 236. A spark plug 232 (FIG. 3) is then installed into the mollified cylinder heads 305 to provide the impetus for detonation of the properly compressed fuel/air mixture.

Figure 6:
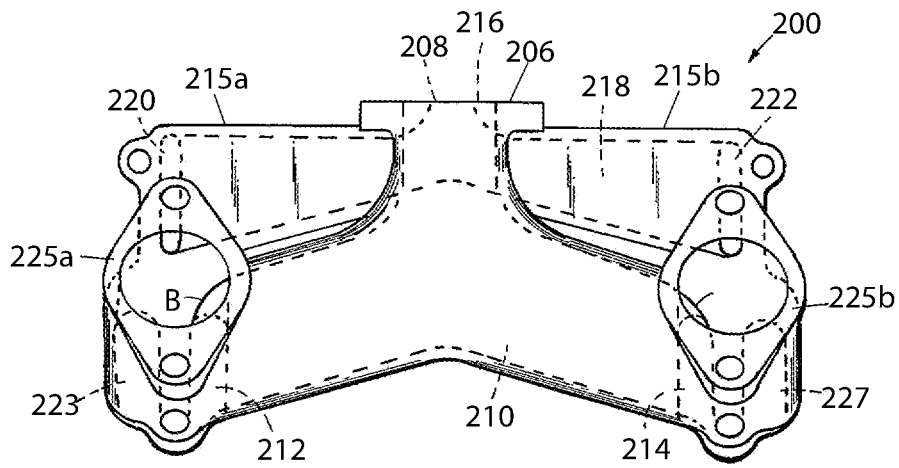
FIG. 6 is a front view of an embodiment of an intake/exhaust manifold of the disclosed modified engine; and, FIG. 7 is a plan view of the intake/exhaust manifold of the disclosed modified engine.
Figure 7:
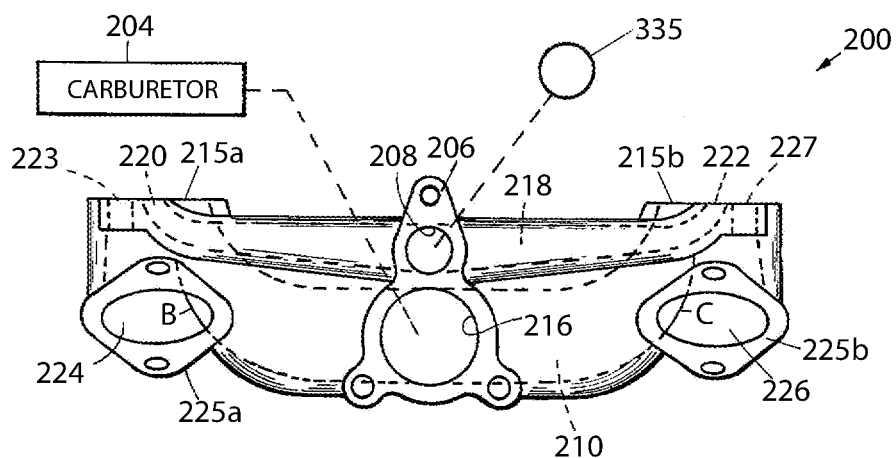

FIG. 6 is a front view of an embodiment of an intake/exhaust manifold 200 of the disclosed modified engine. FIG. 7 is a plan view of the intake/exhaust manifold 200 of the disclosed modified engine. As also illustrated in FIG. 4, an integral manifold 200 is coupled to the engine. The intake/exhaust manifold 200 serves both as the intake and exhaust means and includes a carburetor mounting flange 206 for the carburetor 204 (FIG. 7). The intake/exhaust manifold 200 is preferably composed of cast iron with a first manifold passageway 210, a second manifold passageway 218, a first exhaust duct 224 (FIG. 7), and a second exhaust duct 226 (FIG. 7) integrally formed therein.

The carburetor mounting flange 206 includes an intake aperture 216 communicating with a first manifold passageway 210 that transports the fuel/air mixture from the carburetor 204 to each of the engine cylinders 134, 136 (FIG. 3) in turn. The first manifold passageway 210 terminates in a first manifold opening 212 (FIG. 6) at a first end and a second manifold opening 214 (FIG. 6) at a second end. The first manifold opening 212 is configured to be cast into a first mounting plate surface 215a. The second manifold opening 214 is configured to be cast into a second mounting plate surface 215b. As illustrated in FIG. 7, the manifold is bolted to the engine first housing 12 along surfaces 215a, 215b facing the engine first housing 12 for coupling the manifold openings 212, 214 of the first manifold passageway 210 to the intake ports of the first cylinder 134 (FIG. 3) and the second cylinder 136 (FIG. 3), respectively. The carburetor 204 may be any commercially available device, complete with an adjustable throttle, capable of delivering an adequate fuel/air mixture to operate the device 300 at the required speed.

The carburetor mounting flange 206 also includes a small intake aperture 208 communicating with the second manifold passageway 218, which is blocked by a manifold plug 335 (FIG. 6). The second manifold passageway 208 is unused, as the first igniter piston 150 and the second igniter piston 152 (FIG. 1) have been removed during modification of the unmodified engine 10. This obviates a need for a third manifold opening 220 and a fourth manifold opening 222, as shown in FIGS. 5 and 6. The manifold plug 335 may be attached to the carburetor mounting flange 206 by any appropriate means, such as threaded fasteners, welding, or the like.

The intake/exhaust manifold 200 further includes a pair of exhaust ducts 224 and 226 (FIG. 7). The first exhaust duct 224 originates on the engine side of the intake/exhaust manifold 200 as a first exhaust duct aperture 223, which is in alignment and communicates with the exhaust port (not shown) of the first cylinder 134 (FIG. 3). The first exhaust duct 224 terminates on an opposite side of the intake/exhaust manifold 200 in a first exhaust flange 225a. The second exhaust duct 226 originates at a second exhaust duct aperture 227 and terminates in a second exhaust flange 225b. Those skilled in the art will recognize that proper operation of the modified engine 300 would include a coupling means for exhaust pipes (not shown) to the exhaust flanges 225a, 225b for exhausting gases therefrom.

The construction of the intake/exhaust manifold 200, as illustrated in FIGS. 6 and 7, juxtaposes the exhaust ducts 224, 226 (FIG. 7) of the intake/exhaust manifold 200 with the convoluted first manifold passageway 210 such that the incoming fuel is preheated at areas B and C of the first manifold passageways 210. This preheating prevents droplet formation on the curved wall as can occur when the fuel/air mixture is cooled due to the Venturi action of the carburetor 204 (FIG. 6).

The fuel/air mixture exiting from the intake/exhaust manifold 200 enters the modified engine 300 (FIGS. 3 and 4) through intake ports (not shown) of the cylinder housings 16, 18 (FIGS. 3 and 4) that are located in the cylinders 134, 136 (FIG. 3), respectively, at a lower end of travel of the piston 92, 94 (FIG. 3). The fuel/air mixture is then transferred to the main compression cavities 236 (FIG. 3) by means of transfer ports 89 (FIGS. 2 and 3) and associated ducts for the pistons 92, 94. These ports 89, as is conventional in two-cycle engines, transfer the fuel charge from the underside of the piston 92, 94 to the main compression cavity 236 (FIGS. 3 and 5) during the intake and compression portion of each cycle of operation.

Referring to FIGS. 3 and 4, the drive shaft 30 is supported at opposite ends in the housings 12, 14 by means of a first main bearing 26 (FIG. 4) seated in a first journal 27 (FIG. 4) and a second main bearing 28 (FIG. 4) seated in a second journal 29 (FIG. 4). The first journal 27 is located within the engine second housing 14 while the second journal 29 is cast into the engine first housing 12. This design permits the use of relatively simple main bearings 26, 28 as opposed to split bearings frequently required. The shaft 30 includes a shaft aperture 31 (FIGS. 1, 3 and 4) extending centrally therethrough. Integrally formed on the drive shaft 30 is an eccentric cam 32 (FIGS. 1-4) spanned on opposite sides by a first shoulder 34 (FIGS. 1, 3 and 4) and a second shoulder 36 (FIG. 4), which extend between the bearings 26 and 28.

Referring to FIG. 4, a first external thread 33 is disposed upon the shaft 30 in proximity to the first shoulder 34. The first external thread 33 is configured to receive thereon a preferably spiral drive gear 15 used for the auxiliary drive of a distributor rotor and an oil pump (not shown). The drive shaft 30 terminates at an opposite end in a second external threaded 35 to which a flywheel-mounting flange 40 is secured. The first external thread 33 and the second external thread 35 may be any common, or unique, thread form suitable for the purpose, and may differ in form or handing. A first shaft seal 37 engages the outer cylindrical surface of the drive shaft 30 to seal the shaft 30 extension through the engine second housing 14. Similarly, a second shaft seal 38 is located between the junction of the engine first housing 12 and the external cylindrical surface of flywheel mounting flange 40.

The flywheel mounting flange 40 includes a cylindrical disc 42 that fits within an annular recess 44 of a flywheel 45 (FIGS. 3 and 4) of the modified engine 300. The flywheel 45 includes a plurality of arcuate segmented fan blades 56 (FIGS. 3 and 4) that serve to circulate air and can be used in conjunction with suitable shrouds for forcing sufficient air over the modified engine 300 for cooling. The flywheel 45 is bolted to the cylindrical disc 42 around the periphery thereof by suitable fasteners (not shown).

Referring still to FIG. 4, a solid transmission shaft 46 (FIGS. 2 and 4) extends in spaced relationship through the shaft aperture 31 (FIGS. 1, 3 and 4) and is preferably provided with a spline 48 for coupling to a clutch disc of a conventional throw-out clutch 50, which is further coupled to the flywheel 45 by conventional means. The flywheel 45 includes a pilot bearing 47b, which fits within a recess 47a of the flywheel 45 for the radial support of a first end of the transmission shaft 46. The mechanical interconnection of the clutch 50 to the transmission shaft 46 and the flywheel 45 is represented by the dotted lines 51 and 53, respectively.

The opposite end of the transmission shaft 46 extends outwardly through a transmission mounting bell 13, which forms an integral portion of the engine second housing 14. The transmission mounting bell 13 is shaped and includes any necessary provisions for directly receiving and coupling a conventional transmission 55 to the modified engine 300 with a forward bearing of the transmission 55 serving to support the end of the transmission shaft 46 in spaced aligned relationship within drive shaft 30. A relatively lightweight sheet metal protective shield can be employed to surround the flywheel 45 and clutch 50 that extend from the modified engine 300 at the opposite end of the transmission shaft 46.

Thus, the modified engine 300 with the drive shaft 30 provides a compact mounting arrangement for the modified engine 300 in an automobile. For this purpose, each of the housings 12 and 14 may include suitable and conventional motor mounting structure. The coupling of transmission 55 to the transmission shaft 46 is represented by the dashed line 54.

The disclosed embodiments of the modified engine 300 can be utilized by an enabled individual in a simple and straightforward manner with little or no training. After initial purchase or acquisition of the modified engine 300, it would be arranged as indicated in FIGS. 2-4. The method of installing and utilizing the modified engine 300 may be achieved by performing the following steps: acquiring a model of the modified engine 300 having a desired size in keeping with the intent and purpose of a user; installing the modified engine 300 into a desired application; providing access to fuel and air for the internal combustion process; providing for the expulsion of exhaust gases from the exhaust flanges 225a, 225b; providing a sufficient quantity of lubricant, such as oil; providing other peripheral requirements, such as, but not limited to starting the modified engine 300, a means to operate the clutch 50 and the transmission 55, and a means to selectively vary the carburetor 204 to achieve the desired results; and enjoying the use of the modified engine 300.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

What is claimed is:

1. An engine comprising:
    an engine housing defining a pair of cylinders, a pair of ignitor cylinders and a crankcase;
    a pair of cylinder heads connected to said engine housing and enclosing said pair of cylinders;
    a pair of spark plugs connected to said pair of cylinder heads and in communication with said pair of cylinders;
    a piston assembly in communication with said pair of cylinders;
    a rocker arm connected to said piston assembly;
    a connecting rod connected to said rocker arm;
    a drive shaft disposed within said crankcase and connected to said connecting rod;
    a pair of ignitor cylinder plugs fit within said pair of ignitor cylinders;
    ignitor piston rod apertures formed though said engine housing; and,
    rod aperture plugs fit within said piston rod apertures.

2. The engine of claim 1, wherein said a piston assembly comprises:
    a first piston rod;
    a first piston connected to said first piston rod and configured to reciprocate within said first cylinder;
    a second piston rod;
    a second piston connected to said second piston rod and configured to reciprocate within said second cylinder; and,
    a crosshead block interconnecting said first piston rod and said second piston rod.

3. The engine of claim 2, further comprising an upper guide and an opposed lower guide connected within said engine housing and configured restrict said crosshead block to reciprocal motion.

4. The engine of claim 2, wherein said rocker arm comprises a rocker arm first end pivotably connected to said crosshead block and a rocker arm second end.

5. The engine of claim 4, wherein said connecting rod comprises an annular connecting rod first end and a connecting rod second end pivotably coupled to said rocker arm second end.

6. The engine of claim 5, wherein said drive shaft comprises an eccentric cam disposed within said annular connecting rod first end.

7. The engine of claim 6, further comprising a roller bearing disposed between an outer surface of said eccentric cam and an inner surface of said annular connecting rod first end.

8. The engine of claim 1, further comprising a pair of counterbalance arms each comprising a counterbalance arm first end pivotably connected to said engine housing and a counterbalance arm second end comprising an enlarged head, said counterbalance arm pivotably connected to said rocker arm at a counterbalance arm intermediate location.

9. The engine of claim 1, further comprising a housing cap connected to said engine housing and comprising a crankcase vent configured to equalize pressure in said crankcase.

10. The engine of claim 1, wherein each cylinder head of said pair of cylinder heads comprises:
   a main compression cavity configured to align with one of said pair of cylinders;
   a spark plug aperture formed through said cylinder head within said main compression cavity;
   an ignition port; and,
   an ignition port plug formed within said first ignition port.

11. The engine of claim 1, further comprising an intake/exhaust manifold connected to said engine housing, wherein said intake/exhaust manifold comprises:
   a first manifold passageway comprising:
      a first end terminating at a first manifold opening; and,
      a second end terminating at a second manifold opening;
   a second manifold passageway;
   a first exhaust duct comprising a first exhaust duct aperture in communication with said first cylinder and a first exhaust flange;
   a second exhaust duct comprising a second exhaust duct aperture in communication with said second cylinder and a second exhaust flange;
   a carburetor mounting flange configured for attachment of a carburetor and comprising:
      a first intake aperture in communication with said first manifold passageway; and,
      a second intake aperture in communication with said second manifold passageway; and,
   a manifold plug fit within said second intake aperture to block said second manifold passageway.

12. The engine of claim 1, wherein said drift shaft further comprises:
   a drive shaft first end;
   a spiral drive gear coupled to said drive shaft first end;
   a drive shaft second end; and,
   wherein said engine further comprises:
      a distributor rotor and an oil pump connected to said spiral drive gear; and,
      a flywheel coupled to said drive shaft second end.

13. The engine of claim 1, further comprising:
   a transmission shaft extending through said drive shaft and comprising:
      a transmission shaft first end; and,
      a transmission shaft second end;
   a transmission connected to said transmission shaft first end; and,
   a clutch connected to said transmission shaft second end.

14. An engine comprising:
   an engine housing;
   a first cylinder defined by said engine housing;
   a second cylinder defined by said engine housing;
   a crankcase defined by said engine housing;
   a first cylinder head connected to said engine housing and enclosing said first cylinder;
   a second cylinder head connected to said engine housing and enclosing said second cylinder;
   a piston assembly comprising;
      a first piston rod;
      a first piston connected to said first piston rod and configured to reciprocate within said first cylinder;
      a second piston rod;
      a second piston connected to said second piston rod and configured to reciprocate within said second cylinder; and,
      a crosshead block interconnecting said first piston rod and said second piston rod;
   a rocker arm comprising a rocker arm first end pivotably connected to said crosshead block and a rocker arm second end;
   a connecting rod comprising an annular connecting rod first end and a connecting rod second end pivotably coupled to said rocker arm second end;
   a drive shaft disposed within said crankcase and comprising an eccentric cam disposed within said annular connecting rod first end;
   a first counterbalance arm comprising a first counterbalance arm first end pivotably connected to said engine housing and a first counterbalance arm second end comprising a first head, said first counterbalance arm connected to said rocker arm second end at a first counter balance arm intermediate location;
   a second counter balance arm comprising a second counterbalance arm first end pivotably connected to said engine housing and a second counterbalance arm second end comprising a second head, said second counter balance arm pivotably connected to said rocker arm at a second counter balance arm intermediate location;
   an upper guide and an opposed lower guide connected within said engine housing and configured restrict said crosshead block to reciprocal motion;
   a first ignitor cylinder defined by said engine housing;
   a first ignitor cylinder plug fit within said first ignitor cylinder;
   a second ignitor cylinder defined by said engine housing;
   a second ignitor cylinder plug fit within said second ignitor cylinder;
   ignitor piston rod apertures formed though said engine housing;
   rod aperture plugs fit within said piston rod apertures; and,
   a housing cap connected to said engine housing and comprising a crankcase vent configured to equalize pressure in said crankcase.

15. The engine of claim 14, wherein said first cylinder head comprises:
   a first main compression cavity configured to align with said first cylinder;
   a first spark plug aperture formed through said first cylinder head within said first main compression cavity;
   a first ignition port; and,
   a first ignition port plug formed within said first ignition port.

16. The engine of claim 15, wherein said second cylinder head each comprises:
- a second main compression cavity configured to align with said second cylinder;
- a second spark plug aperture formed through said second cylinder head within said second main compression cavity;
- a second ignition port; and,
- a second ignition port plug fit within said second ignition port.

17. The engine of claim 16, further comprising an intake/exhaust manifold connected to said engine housing, wherein said intake/exhaust manifold comprises:
- a first manifold passageway comprising:
  - a first end terminating at a first manifold opening; and,
  - a second end terminating at a second manifold opening;
- a second manifold passageway;
- a first exhaust duct comprising a first exhaust duct aperture in communication with said first cylinder and a first exhaust flange;
- a second exhaust duct comprising a second exhaust duct aperture in communication with said second cylinder and a second exhaust flange;
- a carburetor mounting flange configured for attachment of a carburetor and comprising:
  - a first intake aperture in communication with said first manifold passageway; and,
  - a second intake aperture in communication with said second manifold passageway; and,
- a manifold plug fit within said second intake aperture to block said second manifold passageway.

18. The engine of claim 17, wherein said drift shaft further comprises:
- a drive shaft first end;
- a spiral drive gear coupled to said drive shaft first end;
- a drive shaft second end; and,
- wherein said engine further comprises:
  - a distributor rotor and an oil pump connected to said spiral drive gear; and,
  - a flywheel coupled to said drive shaft second end.

19. The engine of claim 18, further comprising:
- a transmission shaft extending through said drive shaft and comprising:
  - a transmission shaft first end; and,
  - a transmission shaft second end;
- a transmission connected to said transmission shaft first end; and,
- a clutch connected to said transmission shaft second end.

20. A method for modifying an engine comprising:
providing said engine comprising:
- an engine housing defining a pair of cylinders, a pair of ignitor cylinders and a crankcase;
- a pair of cylinder heads connected to said engine housing and enclosing said pair of cylinders, each cylinder head comprising:
  - a main compression cavity configured to align with one of said pair of cylinders;
  - a spark plug aperture;
  - an ignition port extending between said spark plug aperture and said main compression cavity;
- a piston assembly comprising:
  - a pair of ignitor pistons configured to reciprocate within said pair of ignitor cylinders; and,
  - a pair of pistons configured to reciprocate within said pair of cylinders;
- a rocker arm connected to said piston assembly;
- a connecting rod connected to said rocker arm;
- a drive shaft disposed within said crankcase and connected to said connecting rod; and,
- ignitor piston rod apertures formed though said engine housing;

removing said pair of ignitor pistons;
fitting a pair of ignitor cylinder plugs within said pair of ignitor cylinders;
fitting rod aperture plugs within said piston rod apertures;
fitting an ignition port plug within said first ignition port; and,
forming another spark plug aperture through said cylinder head within said main compression cavity.

* * * * *